(12) United States Patent
Liggesmeyer

(10) Patent No.: US 6,907,386 B1
(45) Date of Patent: Jun. 14, 2005

(54) METHOD FOR COMPUTER-SUPPORTED ERROR ANALYSIS OF SENSORS AND/OR ACTUATORS IN A TECHNICAL SYSTEM

(75) Inventor: Peter Liggesmeyer, Neubiberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/367,778

(22) PCT Filed: Mar. 3, 1998

(86) PCT No.: PCT/DE98/00633

§ 371 (c)(1),
(2), (4) Date: Aug. 18, 1999

(87) PCT Pub. No.: WO98/40796

PCT Pub. Date: Sep. 17, 1998

(30) Foreign Application Priority Data

Mar. 11, 1997 (DE) ......................................... 197 09 956

(51) Int. Cl.[7] .............................................. G06F 15/46
(52) U.S. Cl. ........................... 702/185; 702/33; 702/41; 702/42; 702/44; 702/105
(58) Field of Search ........................ 702/33–36, 41–44, 702/105, 108, 113–115, 123, 119, 182–185, 188, 189, 179, 181, FOR 103–104, FOR 123–126, FOR 134–136, FOR 130; 706/51–53; 710/34; 700/109, 174, 28, 31, 34, 38, 103, 108; 714/9, 37, 89; 379/11

(56) References Cited

U.S. PATENT DOCUMENTS

| | | | | |
|---|---|---|---|---|
| 4,680,784 A | * | 7/1987 | Lehnert et al. | 179/175.2 D |
| 4,799,141 A | * | 1/1989 | Drusinsky et al. | 700/12 |
| 5,038,307 A | * | 8/1991 | Krishnakumar et al. | 703/6 |
| 5,161,115 A | * | 11/1992 | Teshima et al. | 702/108 |
| 5,201,296 A | * | 4/1993 | Wunning et al. | 123/479 |
| 5,463,543 A | * | 10/1995 | Wagner | 700/12 |
| 5,481,717 A | * | 1/1996 | Gaboury | 395/700 |
| 5,594,656 A | * | 1/1997 | Tamisier | 364/488 |
| 5,671,141 A | * | 9/1997 | Smith et al. | 701/29 |
| 5,680,332 A | * | 10/1997 | Raimi et al. | 703/13 |
| 5,696,980 A | * | 12/1997 | Brew | 704/273 |
| 5,717,394 A | * | 2/1998 | Schwartz et al. | 341/51 |
| 5,737,213 A | * | 4/1998 | Hallwirth | 364/140 |
| 5,831,853 A | * | 11/1998 | Bobrow et al. | 700/86 |
| 6,047,278 A | * | 4/2000 | Winkelmann | 706/51 |
| 6,059,837 A | * | 5/2000 | Kukula et al. | 703/27 |
| 6,094,151 A | * | 7/2000 | Schwartz et al. | 341/107 |
| 6,141,633 A | * | 10/2000 | Iwashita et al. | 703/15 |
| 6,144,885 A | * | 11/2000 | Scarrah | 700/28 |
| 6,424,444 B1 | * | 7/2002 | Kahn et al. | 359/173 |
| 2002/0013934 A1 | * | 1/2002 | Xie et al. | 716/4 |

FOREIGN PATENT DOCUMENTS

| | | |
|---|---|---|
| EP | 0 352 759 B1 | 1/1990 |
| EP | 0 424 869 A1 | 5/1991 |
| EP | 0 580 663 B1 | 2/1994 |
| EP | 0 685 792 A1 | 12/1995 |
| EP | 0828215 A1 * | 3/1998 |

OTHER PUBLICATIONS

Burch, Jerry R. et al, "Symbolic Model Checking for Sequential Circuit Verification", IEEE Transactions on Computer–Aided Design of Integrated Circuits and systems, vol. 13, No. 4, Apr. (1994), pp. 401–424.

Enders, Reinhard et al, "Generating BDDS for Symbolic Model Checking in CCS", Computer Aided Verification 3rd, Jul. (1991), pp. 203–213.

DIN 25424, Part 1: Fehlerbaumanalyse: Methode und Bildzeichen; Part 2: Handrechenverfahren zur Auswertung eines Fehlerebaums.

Dekleer, J. et al, Diagnosing Multiple Faults, Elsevier Science Publishers, Artificial Intelligence, vol. 32, 1987, pp. 97–130.

Nökel, K. et al, Controller Synthesis and Verification: A Case Study, in: C. Leverentz, T. Lindner, Formal Development of Reactive Systems, Lecture Notes in Computer Science (No. 891), Springer 1995, pp. 55–74.

Bryant, R., Symbolic Boolean Manipulation with Ordered Binary–Decision Diagrams, ACM Computing surveys, vol. 24, No. 3, Sep. (1992), pp. 293–318.

\* cited by examiner

Primary Examiner—Carol S. W. Tsai
(74) Attorney, Agent, or Firm—Staas & Halsey LLP (57) ABSTRACT

Disclosed is a method wherein a state description of the technical system for an error occurrence and a state description of the technical system for error-free operation is determined in order to detect sensor and/or actor errors. The attainable states for both descriptions are preferably determined by model checking. A varying number of states of both descriptions is formed, said states being checked as to whether they comply with predeterminable conditions (e.g. safety requirements).

11 Claims, 9 Drawing Sheets

METHOD FOR COMPUTER-SUPPORTED ERROR ANALYSIS OF SENSORS AND/OR ACTUATORS IN A TECHNICAL SYSTEM

BACKGROUND OF THE INVENTION

It is of enormous significance for complex technical systems or installations to be able to make statements about the dependability of the respective system or, respectively, of the installation.

It is known that statements about the dependability of an arbitrary technical system or, respectively, of an installation can be produced manually, for example by what is referred to as an error tree analysis (see DIN 25424, Part 1: Fehlerbaumanalyse: Methode und Bildzeichen; Part 2: Handrechenverfahren zur Auswertung eines Fehlerebaums) or simulatively or, respectively, analytically on the basis of models specifically produced for this purpose (see J. Dekleer and B. C. Williams, Diagnosing Multiple Faults, Elsevier Science Publishers, Artificial Intelligence, Vol. 32, 1987, pp. 97–130). For the sake of a simple presentation, only technical systems shall be mentioned below. However, technical installations are also covered in the term of technical system within the scope of this document. A complete manual determination of the influences of a technical malfunction of sensors and/or actuators is practically not possible in a complex technical system due to the linked dependencies and the different forms of realizing the control, the control system and the sensor mechanisms and/or actuator mechanisms. The analytical techniques disclosed in the Dekleer et al. reference require the production of a specific model, for which it can generally not be guaranteed that it correctly describes the system respectively under consideration. Of course, the quality of the statements is there substantially reduced. Further, a considerable disadvantage of the approaches disclosed in the Dekleer et al. reference is that the production of the model requires additional developing outlay and time. As a result thereof, a short-term investigation of alternative realizations of a technical system, which is also referred to as rapid prototyping, is prevented.

It is known to describe a technical system in a status-finite description, for example as automat. A status-finite description usually comprises statuses in which actions are implemented when the technical system is in the respective status. Further, the status-finite description usually comprises status transitions that describe possible changes of the technical system between statuses. The technical system can also implement actions in status transitions. It is known in this context in a controlled, technical system to fashion the status-finite description such that the behavior of the control of the technical system and the behavior of the controlled installation is presented as status automat. It is also not assured given these approaches that all possible influences of errors on the system are correctly identified.

Possibilities for textual description of a status automat that are processed with a computer are, for example, interlocking specification language (ISL) or control specification language (CSL), which are described in K. Nökel, K. Winkelmann, Controller Synthesis and Verification: A Case Study, in: C. Leverentz, T. Lindner, Formal Development of Reactive Systems, Lecture Notes in Computer Science (No. 891), Springer 1995, pp. 55–74.

It is also known to employ a status-finite description for generating controls with a computer and for the computer-supported documentation of properties of an error-free technical system.

One possibility for computer-supported documentation of properties of an error-free technical system employs the principle of what is referred to as model checking, this being described in J. Burch et al, Symbolic Model Checking for Sequential Circuit Verification, IEEE Trans. On Computer-Aided Design of Integrated Circuits and Systems, Vol. 13, No. 4, pp. 401–424, April 1994.

It is also known for status-finite description of a system to employ what is referred to as a finite state machine format (FSM Format) whose fundamentals are described in R. Bryant, Symbolic Boolean Manipulation with Ordered Binary-Decision Diagrams, ACM Computing Survey, Vol. 24, No. 3, pp. 293–318, September 1992. Binary decision diagrams (BDD) have the advantage of also compactly representing very extensive status systems in many instances.

SUMMARY OF THE INVENTION

The invention is thus based on the problem of specifying a method for computer-supported error analysis of sensors and/or actuators in a technical system with which the correctness of the error analysis is assured.

The method according to the present invention is implemented with a computer and comprises the following steps:
a) a status-finite description of the technical system is determined in case of error for an error of a sensor and/or of an actuator of the system;
b) a first set of achievable conditions is determined for the technical system;
c) a second set of achievable conditions is determined for the error-effected technical system;
d) a difference quantity is formed from the first set and from the second set;
e) result statuses are determined from the difference quantity, these result statuses satisfying prescribable conditions.

The invention can be graphically described in that a model checking is implemented both for the error-free technical system as well as for a system effected with an error of a sensor and/or actuator. Due to the model checking, all achievable conditions of the error-free or, respectively, of the error-effected system are identified. A difference quantity of statuses is formed from these statuses. The statuses of the difference quantity that meet a prescribable condition, for example a safety demand made of the system, are identified for the difference quantity. These statuses represent a "dangerous" condition with respect to the prescribable condition for the error respectively being investigated.

The method assures that all "dangerous" statuses are identified for all conditions prescribable in view of the respectively investigated error, i.e. for the faulty sensor and/or actuator.

It is advantageous to implement the method for all possible errors of sensors and/or actuators that the technical system comprises. In this way, it is assured for the entire system that all "dangerous" statuses in view of prescribable conditions are identified.

It is also advantageous to allocate failure probabilities to the sensors and/or actuators and to implement the error analysis taking the failure probabilities into consideration. In this way, it is possible without greater calculating outlay in the implementation of the method with a computer to indicate for the identified statuses what the probability is that this status will in fact be reached, a risk estimate for the respectively analyzed system thus becoming extremely simple and surveyable.

For further savings in calculating time in the implementation of the method with a computer, it is also advantageous to realize the status-finite description with a finite automat in the form of a binary decision diagram (BDD).

The method, due to the above-described properties, can be very advantageously employed in the following fields:
given rapid prototyping of the technical system;
within the framework of the error diagnosis of the technical system;
for generating critical test cases for a commissioning and for a system test of the technical system;
for preventative maintenance of the technical system.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

A suitable status-finite description represents the behavior of the control and the behavior of the control system as status automat. The presentation can ensue in various ways, for example in textual form upon employment of ISL or CSL.

Figure 2:
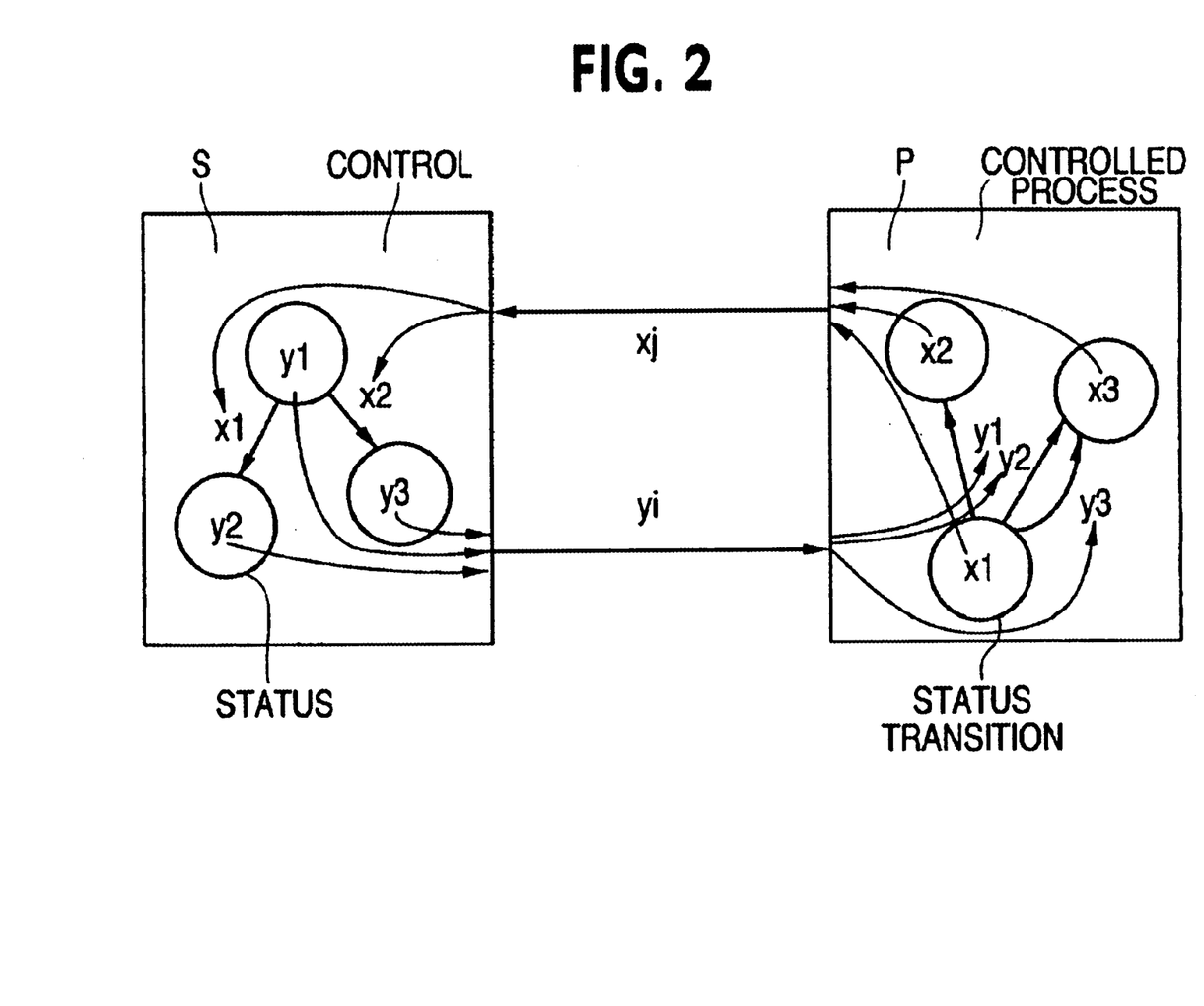
FIG. 2 is a sketch of a status-finite description of a control and of the process of a technical system controlled by the control, whereby the error-free control and the process are each respectively described as a separate status automat.

FIG. 2 shows a simple technical system with an error-free control FS, statuses y1, y2, y3 and status transitions x1, x2 as status automat. The control S describes actuators as statuses. A controlled process P contains the description of sensors x1, x2, x3 as statuses x1, x2, x3 and status transitions y1, y2, y3.

The control S of the system reacts to measured values xj (x1, x2, x3) of sensors X. Status transitions are therefore thus triggered in the control S by sensor data. The statuses are characterized by values yi (y1, y2, y3) of status variables Y that are allocated to actuators. The setting of actuators Y in turn triggers status transitions in the controlled system, i.e. in the process P, which is expressed in the modification of the values of the sensors X.

The status automats of the control S and of the process P implements status transitions in alternation. The outputs of the one automat are the inputs of the respectively other automat.

The interface between control and controlled environment can be automatically recognized in a corresponding description. Further, it is possible—as described in detail later—to derive the value set from such a description that the individual values (statuses or, respectively, status transitions) can assume.

Figure 3:
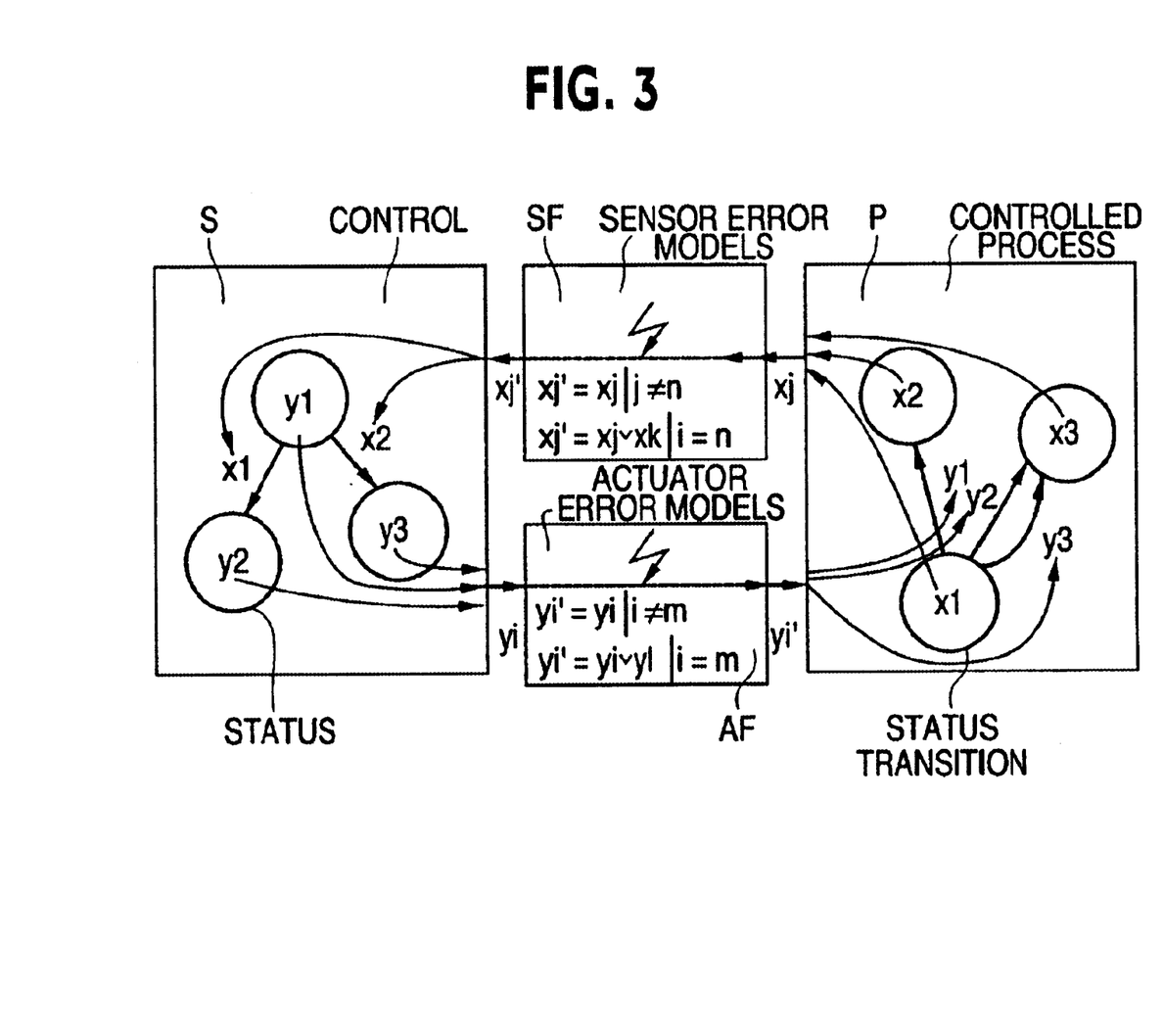
FIG. 3 is a sketch of the status-finite description of FIG. 1 with a symbolically illustrated, general sensor error model and actuator error model.

FIG. 3 symbolically shows an error modeling for error-effected sensors in a sensor error model SF and for error-effected actuators in an actuator error model AF.

Technically, thus, sensors X and actuators Y are connected to the interface between control S and controlled process P. A malfunction of a sensor X leads to the fact that a different, error-effected value x'j is delivered to the control S, i.e. supplied to the control S, instead of the correct measured values xj. A malfunction of an actuator is expressed in the setting of an incorrect value y'i instead of the value yi. Which sensors X and actuators Y are present and what value set is to be taken into consideration here can be derived from the status-finite description.

This allows the automated, systematic analysis of the effects of sensor and actuator errors on the behavior of a controlled system. Sensor error models SF or, respectively, actuator error models AF that describe the respective error of the sensor x and/or actuator y are inserted between the controlled process P and the control S. Exemplary models for intermittent (non-persistent), individual errors of the sensor mechanism and actuator mechanism are recited in FIG. 3.

Figure 4:
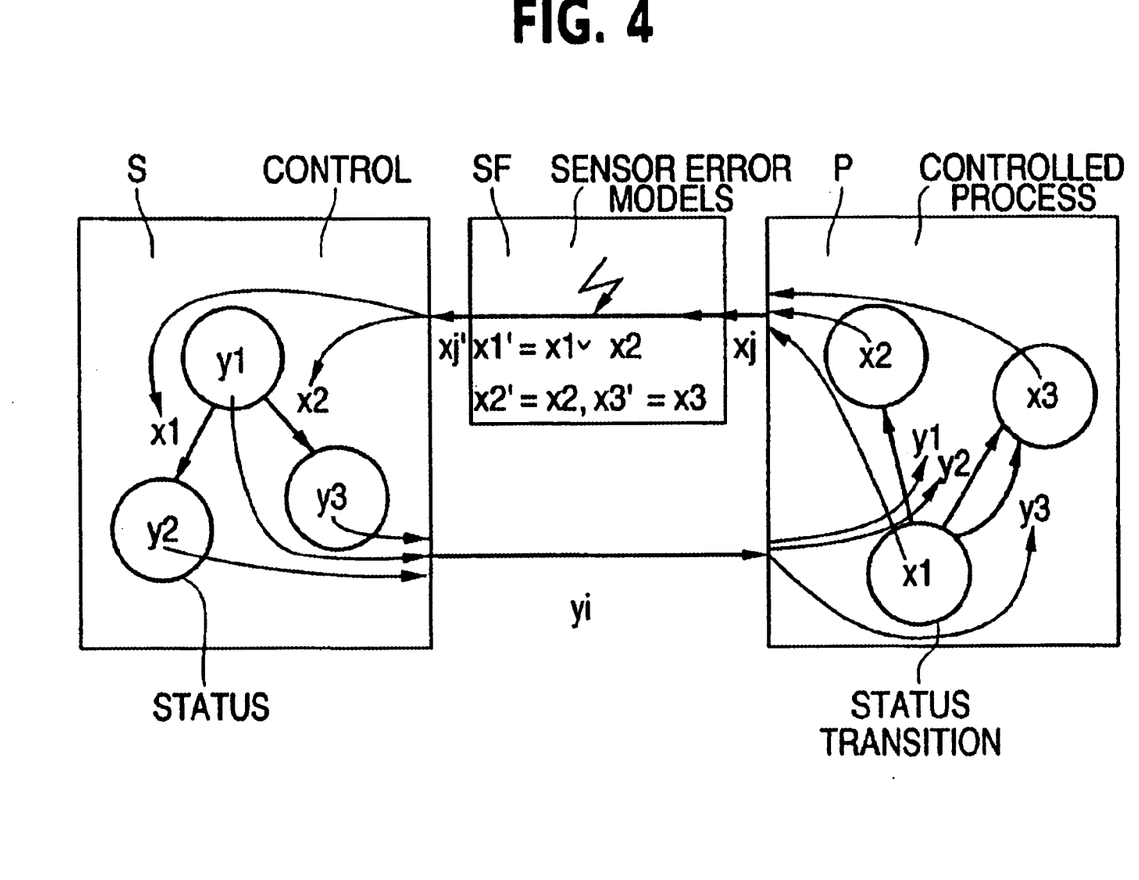
FIG. 4 is a sketch of the status-finite description from FIG. 1 with a symbolically presented, non-persistent error of a sensor.

A non-persistent, individual error of a sensor x is described by the following rule:

A non-persistent, individual actuator y is described by the following rule:

FIG. 4 shows the general sensor error model SF from FIG. 3 for the case that a non-persistent, individual error given a first sensor value x1 is present such that the first sensor value x1 either exhibits the correct, first sensor value x1 or, due to a sensor error, exhibits a second sensor value x2 that would be an incorrect value in this case. The second sensor value x2 and a third sensor value x3 are correctly measured.

An important question that must be answered is whether the combination of control S and control process P can proceed into critical conditions due to the sensor error that would be reliably precluded in the error-free case.

One possibility of producing this proof for the error-free case is offered by what is referred to as model checking, this being described in J. Burch et al, Symbolic Model Checking for Sequential Circuit Verification, IEEE Trans. On Computer-Aided Design of Integrated Circuits and Systems, Vol. 13, No. 4, pp. 401–424, April 1994. This method allows the set of achievable statuses to be identified and to examine whether statuses that, for example, infringe safety conditions are contained.

Figure 5:
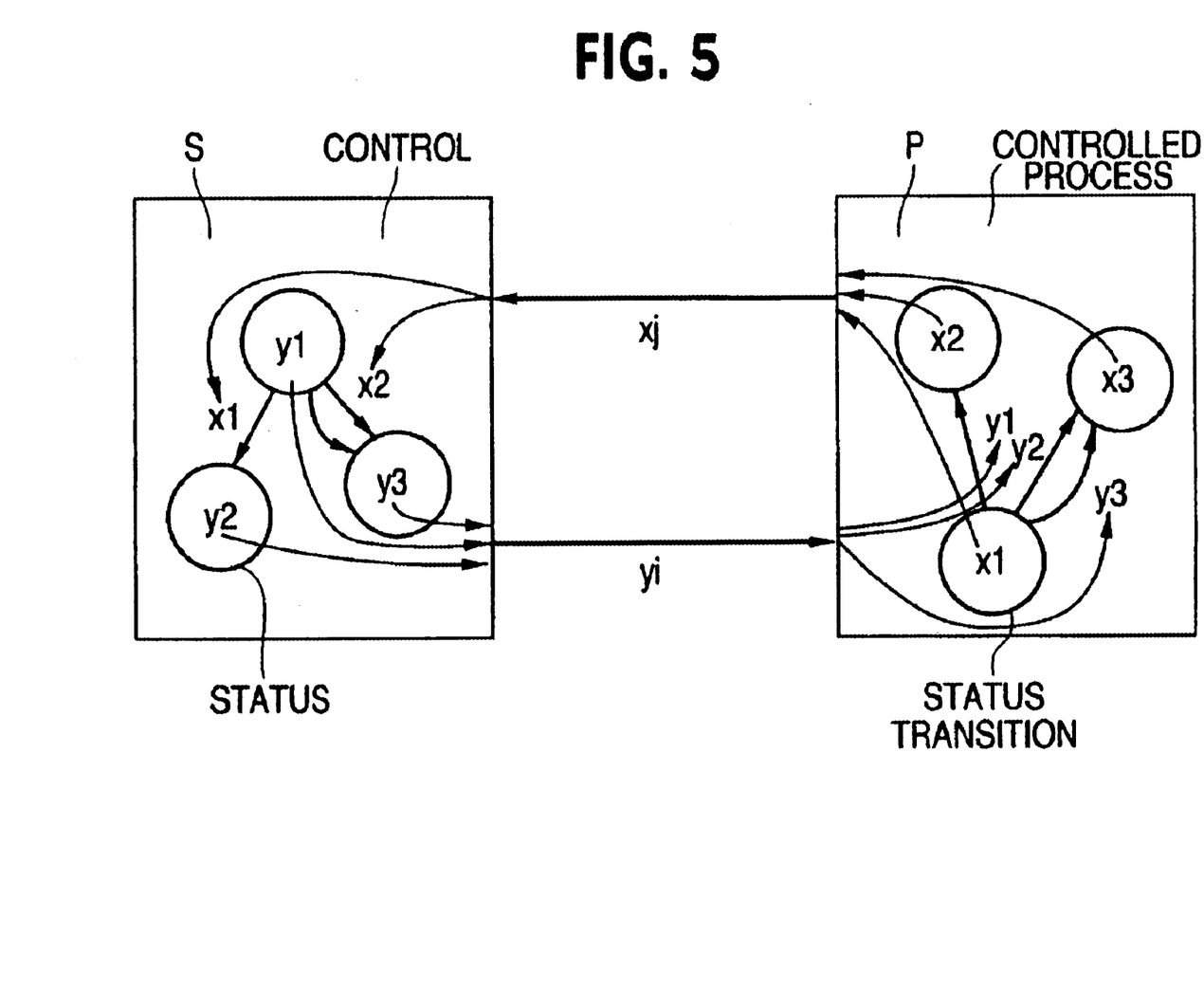
FIG. 5 is a sketch of the status-finite description from FIG. 1 with the error from FIG. 4, whereby the control was modified as replacement of the error model.

In order to be able to apply this technique for error analysis of sensors X and/or actuators Y contained in the system, the sensor error models SF or, respectively, actuator error model AF are described here by a modified control logic (see FIG. 5).

The combination of control S and controlled process P shown in

FIG. 5 behaves identically to the model shown in FIG. 4 in the error case given the first sensor values x1. However, the insertion of an explicit error model between control S and controlled process P can be foregone here. S Due to the assumed, intermittent error, status transitions indicated with x1 are inserted in the control parallel to the status transitions marked with x2.

The following situation is thus described: the second sensor value x2 and the third sensor value x3 are correctly measured. The controlled behavior is therefore unmodified for these values. Since an intermittent error is assumed, the first sensor value x1 can also be correctly reported, so that these status transitions are maintained. If a persistent exchange of the first sensor value x1 with the second sensor value x2 were assumed, then edges labeled with x1 would have to be erased. All status transitions that are marked with x2 can now also be run at the value x1. A corresponding edge is therefore supplemented in the control S. The control S reacts to the value x2 but at the location x1 of the process.

This modification of the control logic for describing errors can be formally automatically implemented by the computer for all errors that can be considered.

The questions about obtainability of critical conditions (for example safety, seizures) for the arising models can likewise be answered by applying model checking. An automatic determination of the statuses achievable in the error-effected system thus preferably ensues upon application of model checking.

Subsequently, a respected difference set of the statuses achievable in the respective error case and the statuses achievable in the error-free case is determined.

Those statuses that at least meet a condition prescribable by the user (for example, violation of a safety demand) or, respectively, that violate this condition are determined dependent on the application.

Figure 1:
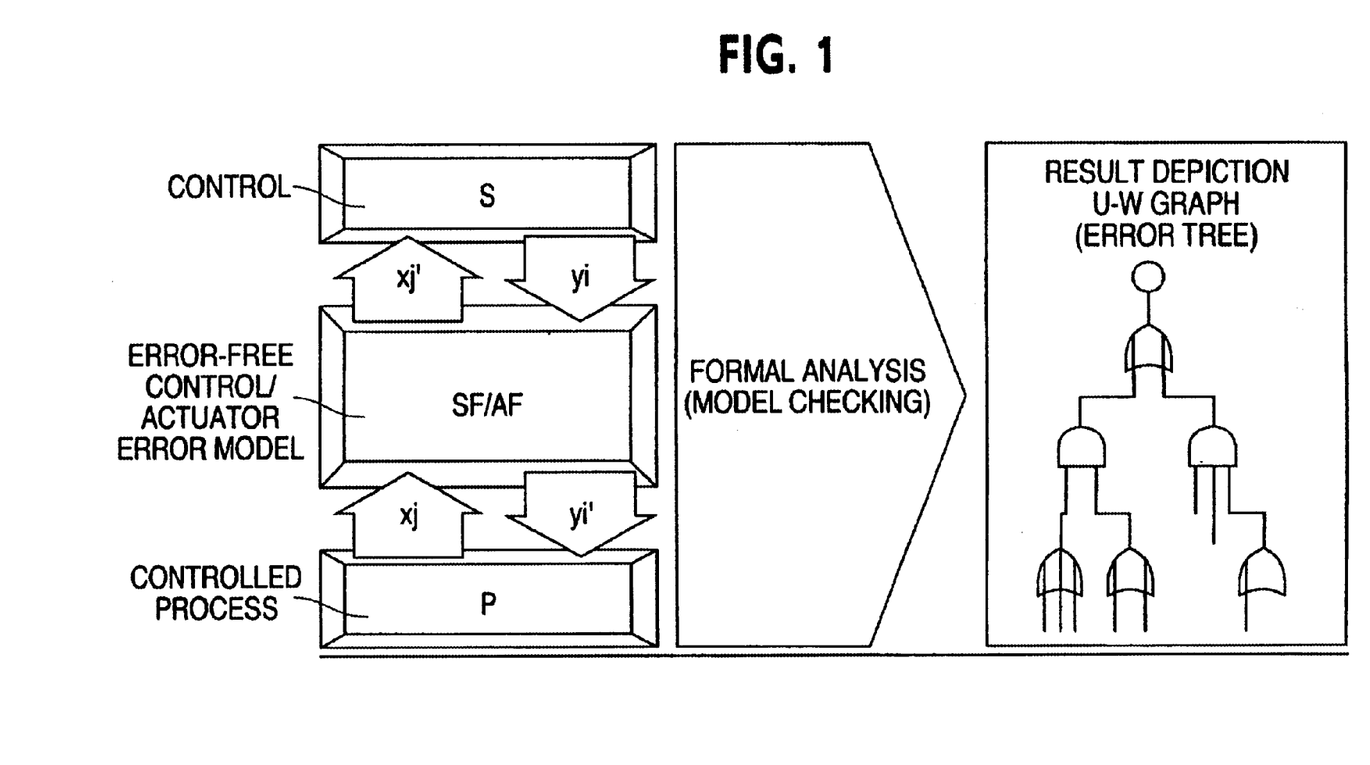
FIG. 1 is a sketch-like presentation of the method.

FIG. 1 shows this procedure again symbolically in a block circuit diagram. At least one sensor error model SF and/or at least one actuator error model AF is produced for the control FS and the controlled process P, a formal analysis of the status-finite description for the error-effected system ensuing, preferably by model checking, taking these into consideration.

For the result of the comparison to the error-free system and the determination "dangerous" conditions, the cause-and-effect relationships between sensor errors or, respectively actuator errors and the possible occurrence of the effect under consideration are determined and preferably portrayed in a cause-and-effect graph.

Figure 6:
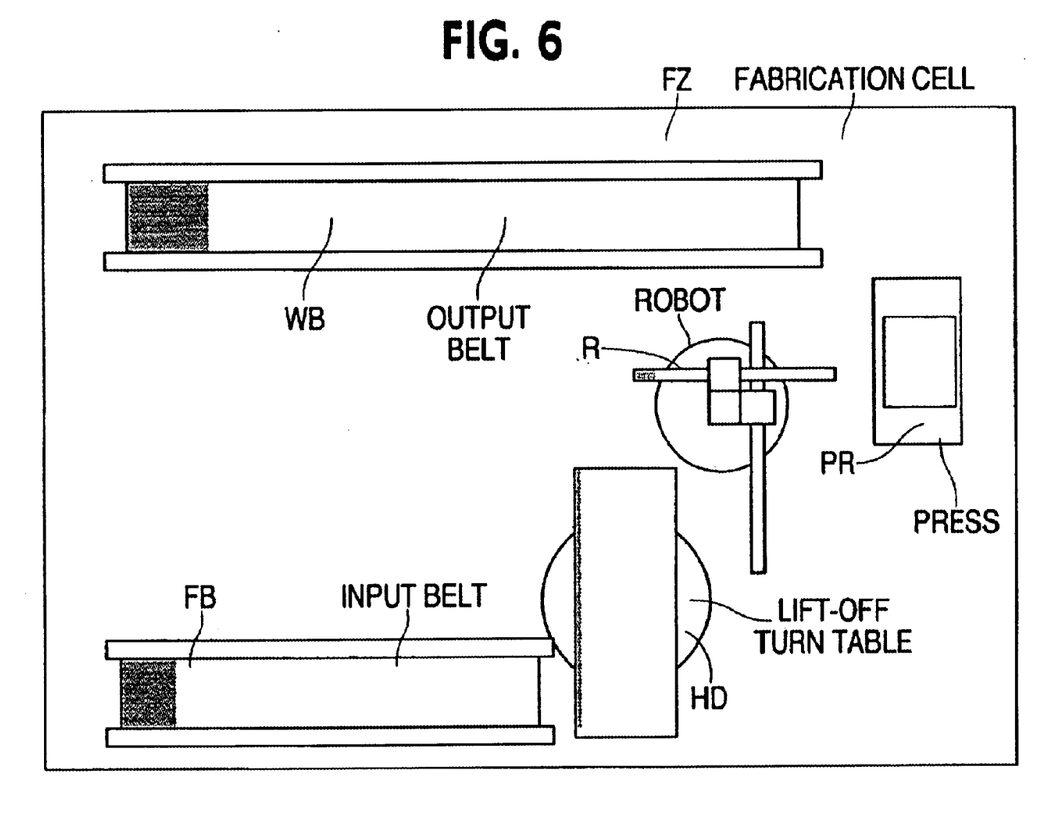
FIG. 6 is a sketch of a plan view of the exemplary embodiment, a lift-off turn table of a manufacturing cell.

FIG. 6 shows a technical system in the form of a lift-off turntable HD of a fabrication cell FZ with which the method is to be presented in yet greater detail.

The fabrication cell FZ comprises a delivering conveyor belt FB at whose end a lift-off turntable picks up workpieces and supplies them to a robot R. The robot R places the workpiece into a press PR and places it—after being shaped—onto an outgoing belt WB. The fabrication cell FZ contains corresponding sensors X and actuators Y.

The lift-off turntable HD can move in vertical (vmov) and horizontal (hmov) direction with the assistance of two drives (not shown). Each drive can be driven in negative (minus) or positive (plus) direction or can stand still (stop).

The lift-off turntable HD has sensors X for vertical (vpos) and horizontal (hpos) position acquisition that can distinguish the positions x0 (bottom), x1 (middle) and x2 (top). In addition, a further sensor (part_on_table) (not shown) acquires the presence of a workpiece WS on the lift-off turntable HD.

Figure 7:
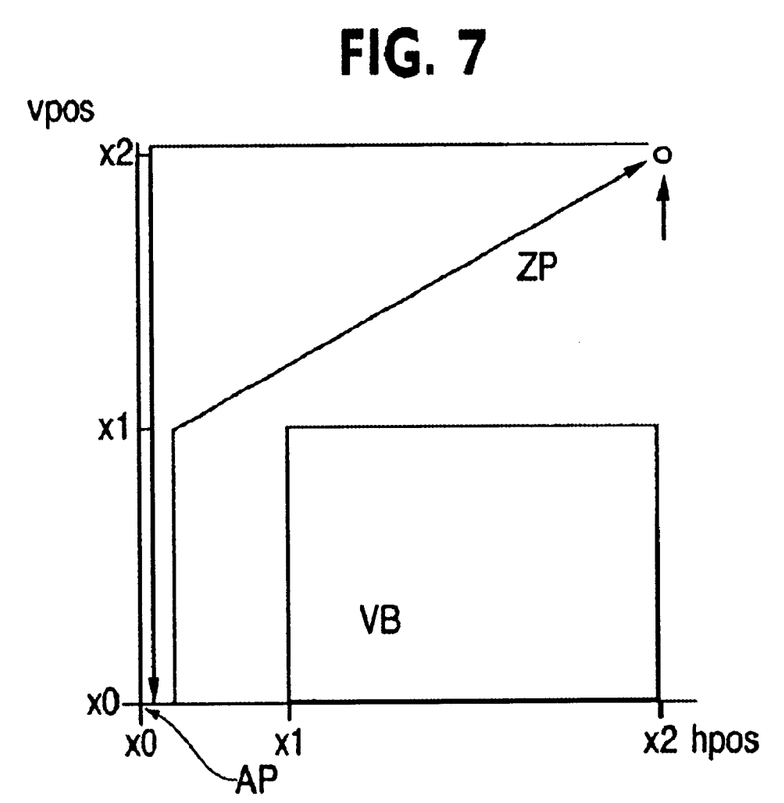
FIG. 7 is a sketch in which the provided movement of the lift-off turntable from FIG. 6 is shown.

The initial position AP of the lift-off turntable HD is at the lower, left stop (x0, x0) without workpiece WS (see FIG. 7). When a workpiece WS falls from the delivering conveyor belt FB onto the lift-off turntable HD, then the target position ZP of the lift-off turntable HD is at the upper right (x2, x2).

The lift-off turntable HD dare never assume a different horizontal position then x0 (left stop) in combination with the vertical position x0 (bottom) since it would otherwise collide with the delivering conveyor belt FB (forbidden area VB).

A description of the status automat of the control FS of the lift-off turntable HD in CSL is recited below:

```
CSLxtClasses table
    Types
        bool            =[no, yes];
        posType         =[x0, x1, x2];
        movType         =[stop, plus, minus];
Class pcd
StateVariables
        input  vpos               : posType default x0;
        input  hpos               : posType default x0;
        input  part_on_table      : bool    default no;
        output vmov: movType default stop;
        output hmov: movType default stop;
Transitions
    start_up     :=    (part_on_table = yes / \ vpos = x0)
                 ==>   (** vmov = plus);
    rotate       :=    (part_on_table = yes / \ vpos = x1 / \ hpos < x2)
                 ==>   (** hmov = plus);
    stophigh     :=    (part_on_table = yes / \ vpos = x2)
                 ==>   (** vmov = stop);
    stop 45      :=    (part_on_table = yes / \ hpos = x2)
                 ==>   (** hmov = stop);
    rotate_back  :=(part_on_table = no / \ vpos = x2 / \
                 / \ hpos = x2) ==> (** hmov minus);
    start_down       :=(part_on_table = no / \ hpos x0 / \
                 / \ vpos = x2) ==> (** hmov = stop / \
                 / \ ** vmov = minus);
    stoplow      :=(part_on_table = no / \ vpos = x0)
                 ==> (** vmov = stop);
End /* Class pcd_control*/
End table
CSLInstances i
        table : pcd;
End i
```

The control logic of the lift-off turntable HD determines the above description in CSL. The head of the CSL description declares data types (value ranges) of the status variables. The subsequent declaration of the status variables uses these type declarations and additionally determines starting values. On the basis of the declaration of status variables as input or output, a determination can be made as to whether it is a matter of a status variable that represents the process condition or whether it encodes the statuses control FS. Input variables of the control FS encode process conditions. Output variables of the control FS encode control conditions.

The line "input vpos: posType default x0" declares a status variable having the name "vpos" that can assume the values x0, x1 and x2 (the values of the type posType) and whose initial values is x0.

The transitions serve for describing the control logic. Transitions are triggered by value combinations of the input variables of the control FS that represent process conditions—i.e. the position of the lift-off turntable HD in the vertical (vpos) and the horizontal (hpos) motion direction and the presence of a workpiece WS on the lift-off turntable HD (part_on_table). The values of the output variables vmov and hmov are modified by the transitions that use the control logic. They describe the statuses of the control. Their values are modified only by status transitions of the control, i.e. by the logic impressed on the control.

These information can be automatically taken from the CSL description. A distinction can be made between inputs of the control (inputs, sensor data) and outputs of the control (outputs: actuator commands). Moreover, the respectively possible values can be recognized (type declarations).

Even after the translation of the CSL description in what is referred to as the Finite State Machine format (FSM format), the information are essentially preserved. This FSM format represents the status-finite description in the form of what are referred to as binary decision diagrams (BDD) that have the advantage of also representing very extensive status systems in compact form in many instances R. Bryant, Symbolic Boolean Manipulation with Ordered Binary-Decision Diagrams, ACM Computing Survey, Vol. 24, No. 3, pp. 293–318, September 1992 presents an overview of binary decision diagrams (BDD).

A process model for describing the reactions of the controlled process is required in addition to the control logic described in CSL in order, for example, to enable statements about the set of achievable statuses. This can ensue in the framework of model checking with the assistance of what are referred to as assumptions. Since model checking is usually also employed in the framework of formal verification of the error-free control, these assumptions are usually already present and can be re-employed in the framework of this analysis.

The assumptions describe how the positions of the lift-off turntable HD and the presence of a workpiece WS can vary dependent on the motion direction and the current position. The below assumption ('table.vmov'=stop/\'table.vpos'=x0)/\
x('table.vpos'=x0) presents that the vertical position is x0 in the next status when the vertical motion has stopped and the current vertical position down is (x0). This assumption is based on the situation that the positions do not change when no motion occurs.

Possible assumptions, i.e. conditions, for the above-described control FS are described below:
process:=g ((('table.vmov'=stop/\'table.vpos'=x0)/\
/\x('table.vpos'=x0)\/('table.vmov'=stop/\
/\'table.vpos'=x1)/\x('table.vpos'=x1)
\/('table.vmov'=stop/\'table.vpos'=x2)/\
/\x('table.vpos'=x2)
\/('table.vmov'=plus/\'table.vpos'=x0)/\
/\x('table.vpos'=x0\/'table.vpos'=x1)\/
\/('table.vmov'=plus/\'table.vpos'=x1)/\
/\x('table.vpos'=x1/\'table.vpos'=x2)\/
\/('table.vmov'=plus/\'table.vpos'=x2)/\
/\x('table.vpos'=x2)\\('table.vmov'=minus/\
/\'table.vpos'=x0)/\x('table.vpos'=x0)\/
\/('table.vmov'=minus/\'table.vpos'=x1)/\
/\x('table.vpos'=x0\/'table.vpos'=x1)\/
\/('table.vmov'=minus/\'table.vpos'=x2)/\
/\x('table.vpos'=x1 \/'table.vpos'=x2))/\
/\(('table.hmov'=stop/\'table.hpos'=x0)/\
/\x('table.hpos'=x0)\/('table.hmov'=stop/\
/\'table.hpos'=x1)/\x('table.hpos'=x1)\/
\/('table.hmov'=stop/\'table.hpos'=x2)/\
/\x('table.hpos'=x2)\/('table.hmov'=plus/\
/\'table.hpos'=x0)/\x('table.hpos'=x0\/
\/'table.hpos'=x1)\/('table.hmov'=plus
/\'table.hpos'=x1)/\x('table.hpos'=x1\/
\/'table.hpos'=x2)\/('table.hmov'=plus/\
/\'table.hpos'=x2)/\x('table.hpos'=x2)\/
\/('table.hmov'=minus/\'table.hpos'=x0)/\
/\x('table.hpos'=x0)\/('table.hmov'=minus/\
/\'table.hpos'=x1)/\x('table.hpos'=x0\/
\/'table.hpos'=x1)\/('table.hmov'=minus/\
/\'table.hpos'=x2)/\x('table.hpos'=x1\/
\/'table.hpos'=x2))/\(('table.vpos'=x0/\
/\'table.hpos'=x0/\'table.vmov'=stop/\
/\'table.hmov'=stop/\
/\'table.part_on_table'=no/\
/\x('table.part_on_table'=yes))/\
\/('table.vpos'=x2/\'table.hpos'=x2/\
/\'table.vmov'=stop/\'table.hmov'=stop/\
/\'table.part_on_table'=yes/\
/\x('table.part_on_table'=no))\/
\/('table.part_on_table'=yes/\
/\x('table.part_on_table'=yes))\/
\/('table.part_on_table'=no/\
/\x('table.part_on_table'=no)))).

Figure 8:
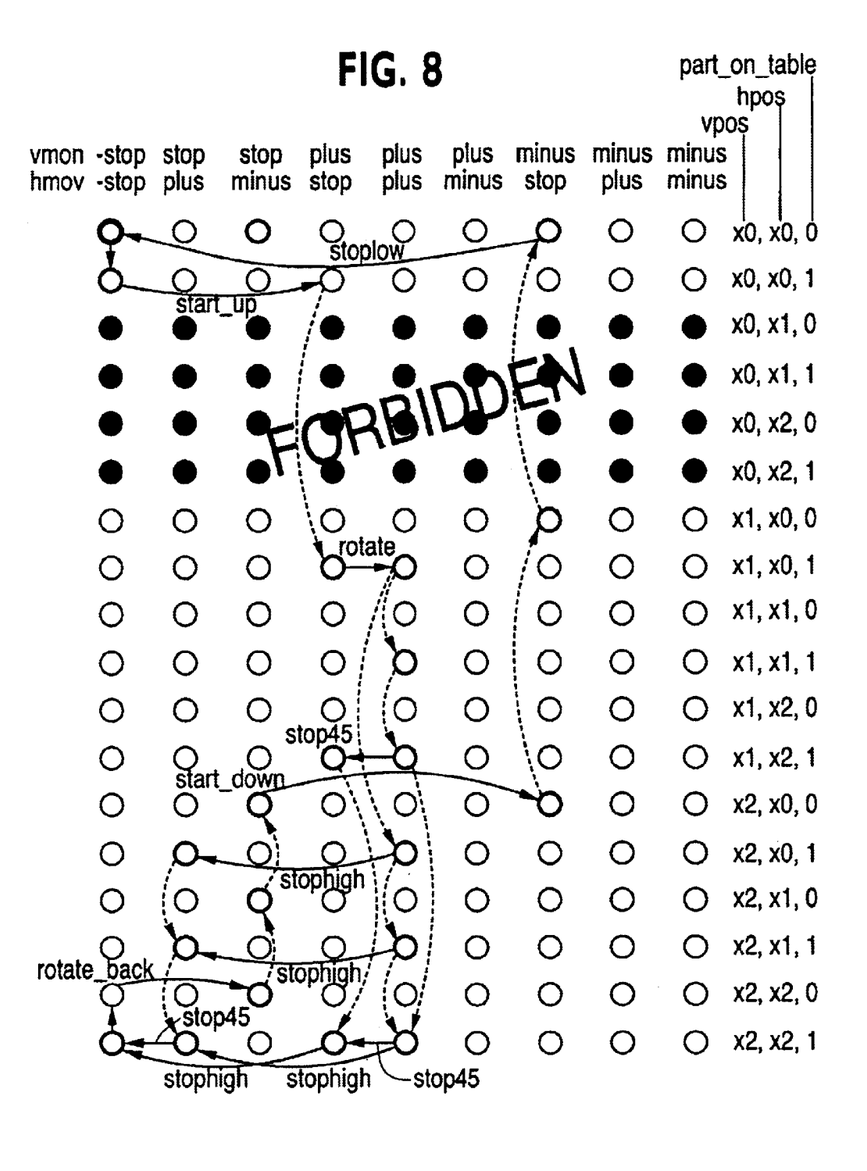
FIG. 8 is a sketch of the status space of the error-free lift-off turntables.

FIG. 8 shows a status space ZR of the lift-off turntable HD and the motion of the error-free lift-off turntable HD in the status space ZR, as derives after the implementation of the model checking on the status-finite description of the error-free control FS with the indicated assumptions.

The rows respectively show a value pair for the triad of the variables (vpos, hpos, part_on_table). A value pair for the dyad of the variables (vmov, hmov) with the respective, above-defined value sets is respectively shown in the columns.

Shaded circles in the status space ZR mark "forbidden" or, respectively, "dangerous" conditions in view of the safety condition. Bold-face circles in the status space ZR mark statuses that the lift-off turntable HD can assume according to the above description. These were determined by the model checking. Status transitions in the status space ZR are indicated with arrows.

Figure 9:
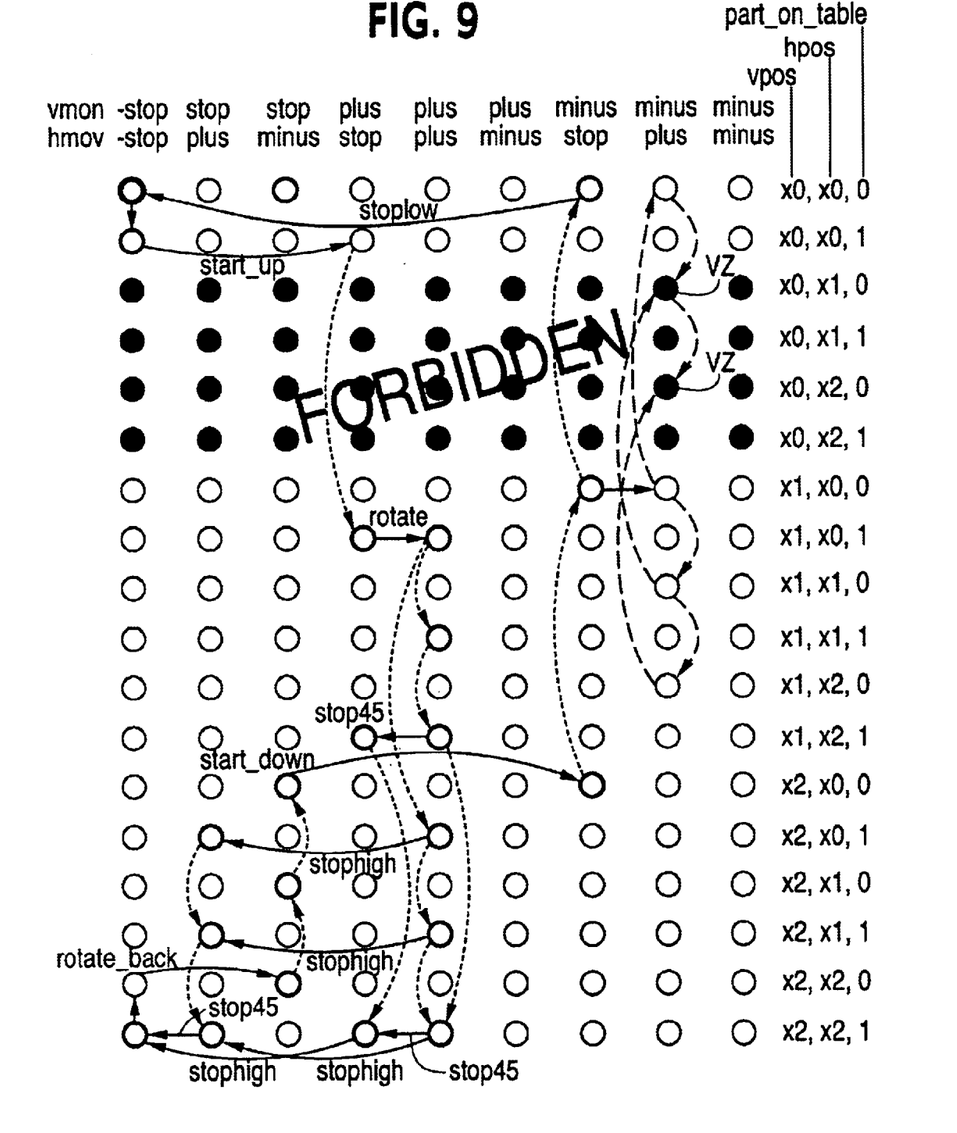
FIG. 9 is a sketch of the status space of an error-effected lift-off turntable.

FIG. 9 shows the status space ZR of the lift-off table HD and the movement of the liftoff turntable HD in the status space ZR when the sensor "part_on_table" incorrectly reports a workpiece WS. The same designations are employed in FIG. 9 as in FIG. 8. It can be clearly seen that statuses can occur for this error case that cannot be achieved in the error-free system. These statuses are referenced VZ in FIG. 9.

Failure probabilities that respectively describe the probability for the occurrence of an error at the sensor x or, respectively, actuator y are allocated to the individual sensors x and/or actuators y. By linking compound probabilites for the occurrence of errors of various sensors and/or actuators and for the occurrence of various statuses, a very simple risk estimate for the technical system can ensue on the basis of this procedure. Details for calculating dependent probabilities for the occurrence of error may be found in DIN 25424, Part 1: Fehlerbaumanalyse: Methode und Bildzeichen; Part 2: Handrechenverfahren zur Auswertung eines Fehlerebaums.

The error analysis thus ensues taking the failure probabilities into consideration.

The method is preferably implemented for all possible errors of the existing sensors and/or actuators.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

The following publications were cited in the framework of this document:

[1] DIN 25424, Part 1: Fehlerbaumanalyse: Methode und Bildzeichen; Part 2: Handrechenverfahren zur Auswertung eines Fehlerebaums

[2] J. Dekleer und B. C. Williams, Diagnosing Multiple Faults, Elsevier Science Publishers, Artificial Intelligence, Vol. 32, 1987, pp. 97–130

[3] K. Nökel, K. Winkelmann, Controller Synthesis and Verification: A Case Study, in: C. Leverentz, T. Lindner, Formal Development of Reactive Systems, Lecture Notes in Computer Science (No. 891), Springer 1995, pp. 55–74

[4] J. Burch et al, Symbolic Model Checking for Sequential Circuit Verification, IEEE Trans. On Computer-Aided Design of Integrated Circuits and Systems, Vol. 13, No. 4, pp. 401–424, April 1994.

[5] R. Bryant, Symbolic Boolean Manipulation with Ordered Binary-Decision Diagrams, ACM Computing Survey, Vol. 24, No. 3, pp. 293–318, September 1992.

What is claimed is:

1. A method for computer-supported error analysis of at least one of sensors and actuators in a technical system, the error analysis being in a form of a finite state description that exhibits states of technical system, the method using a computer, comprising:
   a) determining a finite state description of the technical system for an error case of an error of at least one of a sensor and an actuator in the technical system;
   b) determining a first set of achievable states for the technical system without errors using the finite state description;
   c) determining a second set of achievable states for the technical system having an error, using the finite state description;
   d) forming a difference set from the first set and the second set; and
   e) determining result conditions from the difference set, the result conditions meeting prescribable conditions.

2. The method according to claim 1, wherein method steps a) through e) are implemented for all possible errors of sensors and/or actuators in the technical system.

3. The method according to claim 1, wherein failure probabilities are allocated to the sensors and/or actuators; and wherein the error analysis ensues taking the failure probabilities into consideration.

4. The method according to claim 1, wherein method steps b) and c) ensue according to a method of model checking.

5. The method according to claim 1, wherein a finite state description of a process implemented by the technical system is included in the method.

6. The method according to claim 1, wherein the finite state description of the process is realized by a finite automat.

7. The method according to claim 6, wherein the finite state description is realized by a finite automat formed as a binary decision diagram.

8. A method for rapid prototyping of a technical system, the system having at least one of sensors and actuators in a technical system, the prototyping being in a form of a finite state description that exhibits states of the technical system, the method using a computer, comprising:
   determining a finite state description of the technical system for an error case of an error of at least one of a sensor and an actuator in the technical system, using the finite state description;
   determining a first set of achievable states for the technical system without errors using the finite state description;
   determining a second set of achievable states for the technical system having an error, using the finite state description;
   forming a difference set from the first set and the second set; and
   determining result conditions from the difference set, the result conditions effecting prototyping of the technical system.

9. The method error diagnosis of a technical system, the system having at least one of sensors and actuators in a technical system, the error diagnosis being in a form of a finite state description that exhibits states of the technical system, the method using a computer, comprising:
   determining a finite state description of the technical system for an error case of an error of at least one of a sensor and an actuator in the technical system, using the finite state description;
   determining a first set of achievable states for the technical system without errors;
   determining a second set of achievable states for the technical system having an error, using the finite state description;
   forming a difference set from the first set and the second set; and
   determining result conditions from the difference set, the result conditions effecting error diagnosis of the technical system.

10. A method for generating critical test cases for a commissioning and a system test of a technical system, the system having at least one of sensors and actuators in a technical system, the generating being in a form of a finite state description that exhibits states of the technical system, the method using a computer, comprising:
   determining a finite state description of the technical system for an error case of an error of at least one of a sensor and an actuator in the technical system;
   determining a first set of achievable states for the technical system without errors, using the finite state description;
   determining a second set of achievable states for the technical system having an error, using the finite state description;

forming a difference set from the first set and the second set; and determining result conditions from the difference set, the result conditions effecting the generation of critical test cases.

11. A method for preventive maintenance of a technical system, the system having at least one of sensors and actuators in a technical system, the method being in a form of a finite state description that exhibits states of the technical system, the method using a computer, comprising:

determining a finite state description of the technical system for an error case of an error of at least one of a sensor and an actuator in the technical system;

determining a first set of achievable states for the technical system without errors, using the finite state description;

determining a second set of achievable states for the technical system having an error, using the finite state description;

forming a difference set from the first set and the second set; and determining result conditions from the difference set, the result conditions meeting effecting the preventive maintenance.

* * * * *